United States Patent Office 3,004,998
Patented Oct. 17, 1961

3,004,998
STABLE LEAD ALKYL COMPOSITIONS AND A METHOD FOR PREPARING THE SAME
Hymin Shapiro, Baton Rouge, La., and Herbert R. Neal, Farmington, Mich., assignors to Ethyl Corporation, New York, N.Y., a corporation of Delaware
No Drawing. Filed Dec. 8, 1959, Ser. No. 858,042
5 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C. the decomposition rate increases logarithmically so that a point is soon reached where external heat is no longer required and decomposition becomes self-propagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

Hence, in operations where alkyllead is in the undiluted or concentrated state—viz. separation, purification, blending, transportation, and storage—the likelihood of thermal decomposition must be effectively combatted.

An object of this invention is to stabilize alkyllead compounds against thermal decomposition during one or more of the following operations: separation, purification, blending, transportation, and storage.

This object is accomplished by incorporating with alkyllead compounds a relatively small quantity of a material which has the property of inhibiting alkyllead thermal decomposition. This object is also accomplished by conducting one or more of the foregoing operations in the presence of such a material. The materials which have been found to possess the property are referred to hereinafter as "thermal stabilizers."

The present thermal stabilizers are alkyl acetates. Preferably, the alkyl group has from 1 to about 12 carbon atoms. These acetates when used in amounts from about 1.5 to about 10 percent by weight of the lead alkyl are effective in substantially retarding or preventing thermal decomposition at temperatures above 100° C. for extended periods of time.

The foregoing thermal stabilizers are stable to heat, light, exposure to air, and other conditions to which alkyllead compounds may be subjected during their separation, purification, blending, transportation, and storage. For example, these thermal stabilizers have no tendency to react to form gums or other obnoxious reaction products in the alkyllead composition.

Another feature of this invention is that the present thermal stabilizers are cheap and easily made. Moreover, they are not corrosive to metals used in fabricating alkyllead storage tanks, pipe lines, tank cars, storage drums, and the like.

Our thermal stabilizers are methyl acetate, ethyl acetate; propyl acetate; isopropyl acetate; butyl acetate; sec-butyl acetate; tert-butyl acetate; isobutyl acetate; and the amyl, hexyl, heptyl, octyl, nonyl, decyl, undecyl, and dodecyl acetates.

The chief thermal decomposition products of alkyllead compounds are lead metal and hydrocarbon gas. Hence, a very good index of alkyllead thermal decomposition is liberation of this gas.

The effectiveness of this invention was shown by direct comparison between the decomposition characteristics of unstabilized and stabilized tetraethyllead. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to 160° C., the sample-containing tube was quickly immersed in the bath and clamped with the levelling bottle adjusted to hold the gas buret in place at a zero reading. Then measured was the time during which the sample was held at 160° C., without pronounced thermal decomposition and consequent gas evolution occurring. Thus, the longer the time, the more thermally stable was the alkyllead composition.

With pure tetraethyllead used in 1 ml. amounts, pronounced thermal deterioration occurred within 1 minute as evidenced by rapid gas evolution. In fact, the decomposition of unstabilized tetraethlylead will normally become uncontrollable if it is heated, whether rapidly or slowly, to even 130° C., unless it is possible to very rapidly cool it down to about 100° C. or below.

But, when to the same amount of tetraethyllead there was added 2 weight percent of amyl acetate no pronounced deterioration occurred at 160° C. for over 60 minutes. The same order of effectiveness subsists when repeating this experiment using 4 weight percent of iso-octyl acetate or 10 weight percent of tert-butyl acetate. In fact, comparable effectiveness is shown by all the above thermal stabilizers.

The above-described beneficial behavior of the thermal stabilizers of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizers may be added in appropriate quantity to the alkyllead reaction concentrate just before the separation step which is conducted at a temperature close to the temperature where hazardous run-away decomposition is particularly prevalent. By adding one of the above thermal stabilizers to the reaction concentrate just prior to distillation, the danger arising from unexpected temperature increases is substantially eliminated.

Most preferably the above thermal stabilizers are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention.

What is claimed is:

1. A method of inhibiting the decomposition of an essentially pure alkyllead compound at temperatures from about 100° C. to about 160° C. which comprises incorporating with said compound a small amount of an alkyl acetate in which the alkyl group contains 1 to about 12 carbon atoms; said amount being sufficient to inhibit decomposition and being in the range of from about 1.5 to about 10 percent by weight based upon the weight of said compound.

2. An essentially pure alkyllead compound containing, in amount sufficient to inhibit thermal deterioration thereof at temperatures from about 100° C. to about 160° C., an alkyl acetate in which the alkyl group contains from 1 to about 12 carbon atoms; said amount being in the range of from about 1.5 to about 10 percent by weight based upon the weight of said compound.

3. Essentially pure tetraethyllead containing a small amount of amyl acetate sufficient to inhibit thermal deterioration of the tetraethyllead at temperatures from about 100° C. to about 160° C.; said amount being in the range of from about 1.5 to about 10 percent by weight based upon the weight of the tetraethyllead.

4. Essentially pure tetraethyllead containing a small amount of tert-butyl acetate sufficient to inhibit thermal deterioration of the tetraethyllead at temperatures from about 100° C. to about 160° C.; said amount being in the range of from about 1.5 to about 10 percent by weight based upon the weight of the tetraethyllead.

5. Essentially pure tetraethyllead containing a small amount of isooctyl acetate sufficient to inhibit thermal deterioration of the tetraethyllead at temperatures from about 100° C. to about 160° C.; said amount being in the range of from about 1.5 to about 10 percent by weight based upon the weight of the tetraethyllead.

References Cited in the file of this patent

UNITED STATES PATENTS

| | | |
|---|---|---|
| 2,635,106 | Shapiro et al. | Apr. 14, 1953 |
| 2,727,053 | Krohn | Dec. 13, 1955 |